United States Patent

Sangret

Patent Number: 5,357,845
Date of Patent: Oct. 25, 1994

[54] POWER STEERING SYSTEM

[75] Inventor: Henry C. Sangret, St. Clair Shores, Mich.

[73] Assignee: TRW Inc., Lyndhurst, Ohio

[21] Appl. No.: 82,047

[22] Filed: Jun. 24, 1993

[51] Int. Cl.$^5$ ............................................. F15B 9/10
[52] U.S. Cl. .................................. 91/375 A; 180/141; 91/375 R
[58] Field of Search ................. 91/370, 374, 375 R, 91/375 A, 464; 60/385; 180/141, 143

[56] References Cited

U.S. PATENT DOCUMENTS

| | | |
|---|---|---|
| 4,561,516 | 12/1985 | Bishop . |
| 4,633,963 | 1/1987 | Hasegawa . |
| 4,765,427 | 8/1988 | Yonker . |
| 4,768,604 | 9/1988 | Schipper . |
| 4,793,433 | 12/1988 | Emori et al. ............... 91/375 A X |
| 4,819,545 | 4/1989 | Dymond . |
| 4,840,197 | 6/1989 | Bishop et al. ............... 91/375 A X |
| 4,844,118 | 7/1989 | Kervagoret ............... 91/375 R |
| 4,858,712 | 8/1989 | Neff . |
| 5,046,574 | 9/1991 | Goodrich, Jr. et al. ........... 180/143 |
| 5,070,958 | 12/1991 | Goodrich et al. ............... 180/143 |
| 5,189,941 | 3/1993 | Roethlisberger et al. ........ 91/375 A |

FOREIGN PATENT DOCUMENTS

2661385 10/1991 France ..................... 180/141

*Primary Examiner*—Edward K. Look
*Assistant Examiner*—Hoang Nguyen
*Attorney, Agent, or Firm*—Tarolli, Sundheim & Covell

[57] ABSTRACT

A steering system for a vehicle includes a hydraulic control valve with first and second coaxial valve members rotatable relative to each other to selectively port pressurized fluid to a vehicle power steering motor. The first valve member is connected to and rotatable with an input shaft. The second valve member is connected to and rotatable with an output member. The second valve member is axially movable relative to the first valve member between first and second positions. The input shaft and the output member are directly interconnected by the second valve member and rotatable together to effect manual steering of the vehicle when the second valve member is in its first axial position. The input shaft is rotatable relative to the output member to effect power assisted steering of the vehicle when the second valve member is in its second axial position. The second valve member is moved from its first position to its second position when the velocity of the vehicle is below a predetermined value.

21 Claims, 5 Drawing Sheets

POWER STEERING SYSTEM

BACKGROUND OF THE INVENTION

The present invention relates to a vehicle steering system with auxiliary steering assist, and more specifically to a vehicle steering system with hydraulic power assist.

A known hydraulic power steering system includes a control valve with an inner valve member which is coaxial with and rotatable relative to an outer valve member or sleeve. To effect actuation of a hydraulic steering assist motor to turn the steerable vehicle wheels, the inner valve member is rotated relative to the outer valve member against the influence of a torsion bar. It is known to increase the resistance necessary to actuate the power steering system as vehicle velocity increases by having the fluid pressure in a reaction chamber increase as the vehicle velocity increases. Increasing the fluid pressure in the reaction chamber increases the resistance to relative rotation between the first and second valve members which control fluid flow to a power steering motor and provides the operator with a better "feel" of the road and driving conditions and improves safety. Therefore, as vehicle velocity increases the steering feels more like a manual steering system.

It is also known to include a power steering pump for supplying pressurized fluid to a power steering system, which pump turns on only when the velocity of the vehicle is below a predetermined value. When the velocity of the vehicle exceeds the predetermined value, an input shaft connected to a steering wheel is directly connected to an output member which is connected to a pinion of a rack and pinion steering system. When the velocity of the vehicle exceeds the predetermined value, the steering becomes manual and when the velocity of the vehicle is below the predetermined value there is power assisted steering.

SUMMARY OF THE INVENTION

The present invention provides a new and improved power assisted steering system for an automotive vehicle. The power steering system includes a manually actuated steering control valve assembly. The steering control valve assembly effects manual steering of the vehicle when the velocity of the vehicle exceeds a predetermined value and power assisted steering of the vehicle when the velocity of the vehicle is below the predetermined value. The control valve assembly of the power steering system includes first and second coaxial valve members rotatable relative to each other to port fluid from a source of pressurized fluid to a vehicle power steering motor. The first valve member is connected to (or may be an integral part of) and rotatable with an input shaft. The second valve member is connected to (or may be an integral part of) and rotatable with an output member. The second valve member is axially movable relative to the first valve member between first and second axial positions. In a first position the second valve member directly interconnects the input shaft and the output member for rotation together to effect manual steering of a vehicle. The input shaft is rotatable relative to the output member to effect power assisted steering of the vehicle when the second valve member is in its second position.

A radially extending pin on the input shaft extends into a first slot in the second valve member when the velocity of the vehicle exceeds the predetermined value and the second valve member is in its first position. The pin on the input shaft is located out of the first slot in the second valve member when the velocity of the vehicle is below the predetermined value and the second valve member is in its second position. A radially extending pin on the output member extends into a second slot in the second valve member which limits the axial movement of the second valve member. A spring biases the second valve member into its first position. Fluid pressure in a fluid pressure chamber acts on an axial end surface of the second valve member to move the second valve member from its first position to its second position when the velocity of the vehicle is below the predetermined value.

A pump for supplying fluid to the steering system is turned on when the velocity of the vehicle is below the predetermined value and is turned off when the velocity of the vehicle exceeds the predetermined value. The first and second valve members include surfaces cooperating to define a flow metering orifice through which fluid flows from the power steering motor to a reservoir. The steering system further includes means for causing the fluid flow from the power steering motor to the reservoir to bypass the flow metering orifice during manual steering.

BRIEF DESCRIPTION OF THE DRAWINGS

The foregoing and other features of the present invention will become more apparent to one skilled in the art upon reading the following description of the present invention with reference to the accompanying drawings, wherein.

DESCRIPTION OF A PREFERRED EMBODIMENT

A vehicle steering system 10 (FIG. 1) is operable to turn steerable vehicle wheels (not shown) upon rotation of a steering wheel 12 by an operator of the vehicle. Rotation of the steering wheel 12 actuates a power steering control valve 14 to port fluid from an engine driven pump 18 and supply conduit 20 to either one of a pair of motor conduits 22 and 24 when the velocity of the vehicle is below a predetermined value. The pump 18 is driven by an electric motor 30 that is turned on by an electronic control unit or ECU 32. The ECU 32 receives a signal from a velocity sensor 34. The ECU 32 turns on the electric motor 30 to drive the pump 18 when the velocity of the vehicle is below the predetermined value. The electronic control unit 32 turns the motor 30 off when the velocity of the vehicle exceeds the predetermined value.

High pressure (60 to 80 bar) fluid is conducted from the supply conduit 20 through one of the motor conduits 22 or 24 to assist the operator in effecting operation of a power steering motor 38 to turn the steerable vehicle wheels. Fluid is conducted from the motor 38 to a reservoir 40 through the other one of the motor conduits 22 or 24, the power steering control valve 14, a return conduit 42 and a pressure relief valve 44. The control valve 14 (FIGS. 2 and 3) includes an inner valve member 50 and an outer valve member or sleeve 52. The outer valve member 52 is cylindrical and encloses the inner valve member 50. The inner valve member 50 and the outer valve member 52 are rotatable relative to each other and to a housing 54 about a common central axis 56 when the velocity of the vehicle is below the predetermined value.

Figure 1:
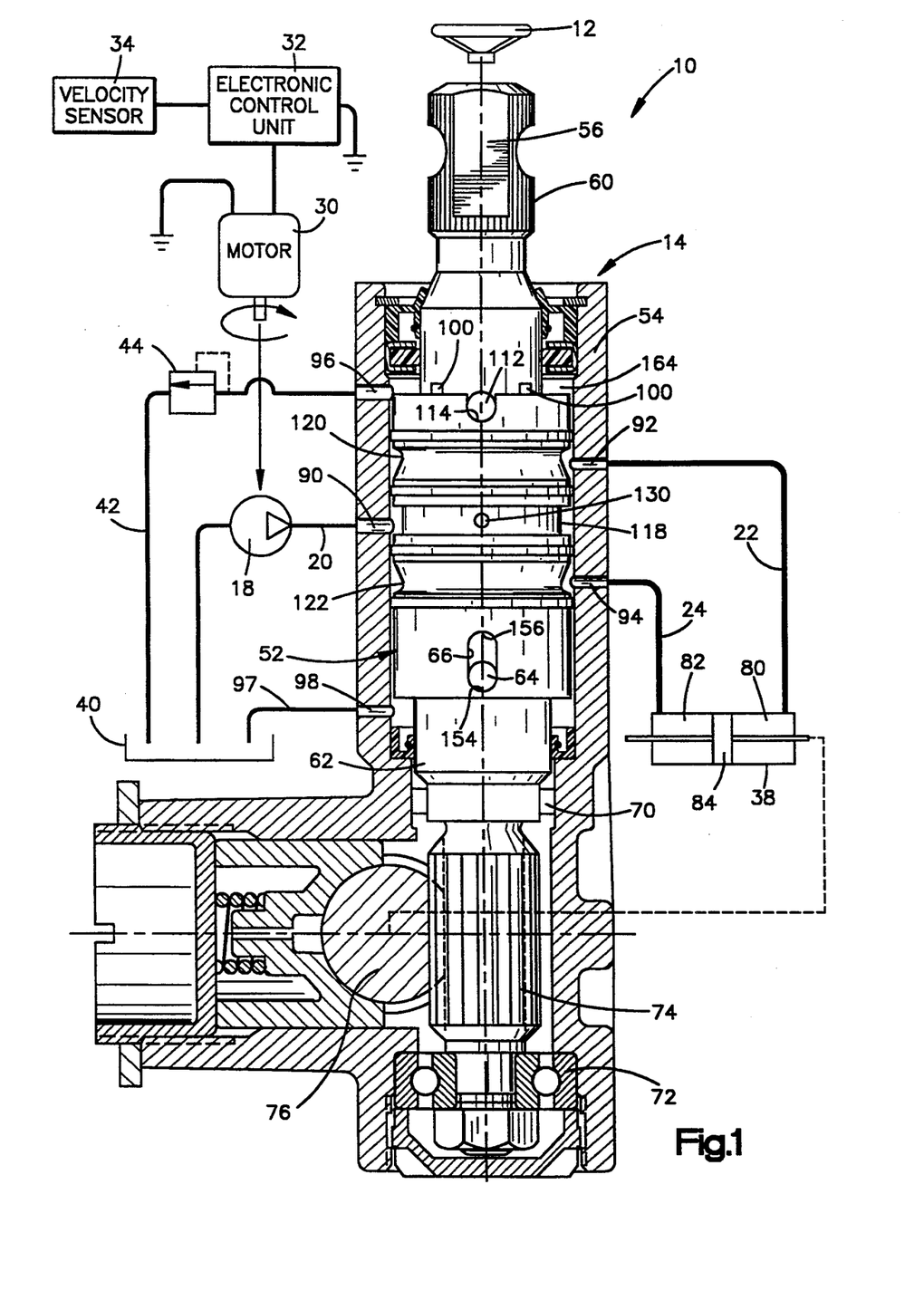
FIG. 1 is a schematic view of a power steering system and illustrates a power steering control valve in section.

The inner valve member 50 is formed as one piece with a cylindrical input shaft or valve stem 60 which is connected with the steering wheel 12 (FIG. 1). The outer valve member 52 is connected with an output member 62 by a pair of pins 64, one of which is shown in FIG. 1. The pins 64 extend into axially extending slots 66 in the outer valve member 52, one of which is shown in FIG. 1. The output member 62 is rotatably supported in the housing 54 by bearings 70 and 72. The output member 62 also provides a pinion gear 74 which is disposed in meshing engagement with a rack 76. The rack 76 is connected with the power steering motor 38 and the steerable vehicle wheels.

A torsion bar 77 (FIGS. 2 and 3) extends through a bore 78 in the input shaft 60. The torsion bar 77 interconnects the input shaft 60 and the output member 62. One end of the torsion bar 77 is connected to the input shaft 60 and the other end of the torsion bar is connected to the output member 62. The torsion bar 77 twists to enable relative rotation between the inner and outer valve members 50 and 52 and when free urges the inner and outer valve members to their initial positions.

The power steering control valve 14 is of the open center type. Therefore, when the power steering control valve 14 is in an initial or unactuated condition and the pump 18 is operating, fluid pressure from the pump is conducted through the motor conduits 22 and 24 (FIG. 1) to motor cylinder chambers 80 and 82 on opposite sides of a piston 84 in the power steering motor 38. Also, fluid flow from the pump 18 is directed by the power steering control valve 14 to the return conduit 42 and reservoir 40.

Supply conduit 20 extends from the pump 18 to an inlet port 90 in the housing 54. Motor conduit 22 extends from one motor port 92 in the housing 54 and motor conduit 24 extends from another motor port 94 in the housing. Hydraulic fluid is discharged from the control valve 14 through a return port 96 in the housing 54 and flows outwardly via the return conduit 42 back to the reservoir 40. A drain conduit 97 extends from a drain port 98 in the housing 54 to the reservoir 40. The drain conduit 97 conducts fluid that leaks in the control valve 14 to the reservoir 40.

Figure 4:
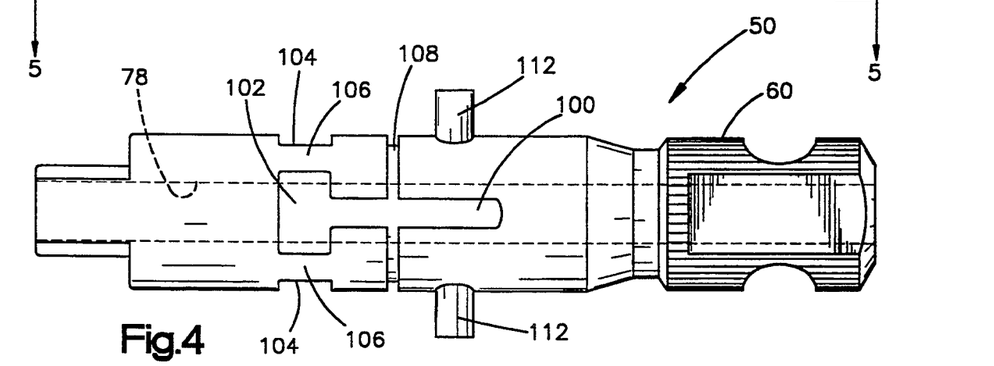
FIG. 4 is an enlarged plan view of an inner valve member of the control valve of FIG. 1.
Figure 5:
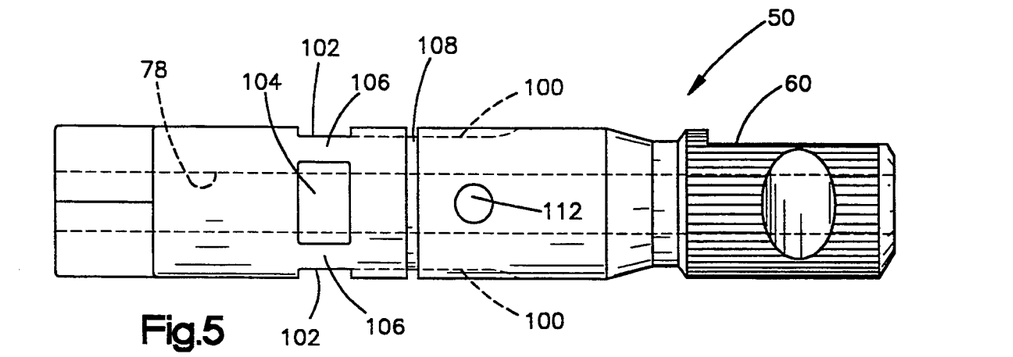
FIG. 5 is a view of the inner valve member taken along the line 5—5 of FIG. 4.

FIGS. 4 and 5 show the inner valve member 50 in detail. A pair of axially extending grooves 100 have widened end portions 102 located near a central portion of the inner valve member 50. Located between the widened end portions 102 of the grooves 100 are grooves 104. Lands 106 are located between the widened end portions 102 and the grooves 104. An annular groove 108 is located axially to the right, as viewed in FIG. 4, of the widened end portions 102 and grooves 104. The annular groove 108 interconnects the axially extending grooves 100.

A pair of pins 112 extend radially outwardly from the inner valve member 50. The pins 112 extend into slots 114 located in the outer valve member 52 when the velocity of the vehicle exceeds the predetermined value, see FIG. 2. The pins 112 are located out of the slots 114 when the velocity of the vehicle is below the predetermined value, see FIG. 3.

Figure 2:
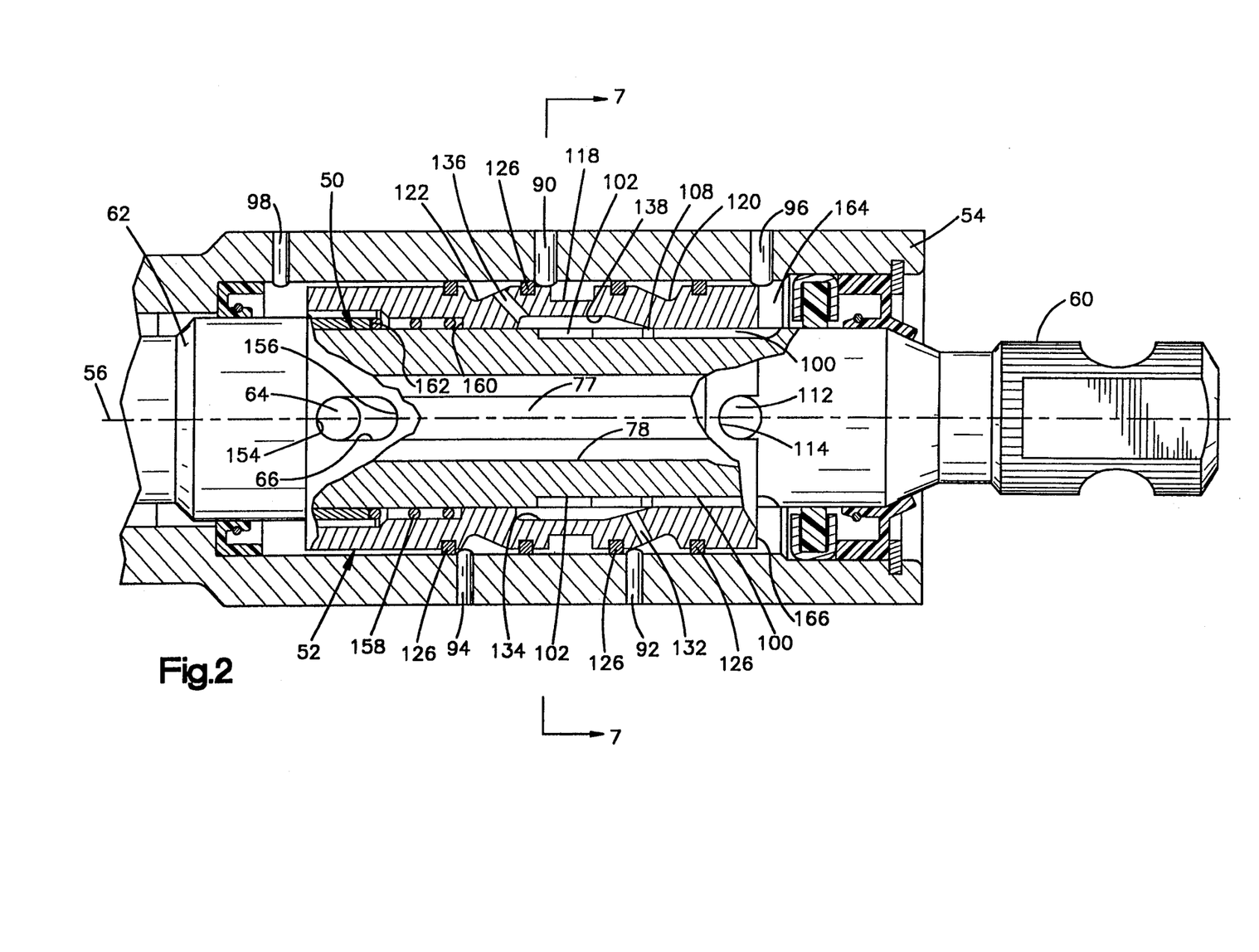
FIG. 2 is a view of a portion of FIG. 1 on an enlarged scale showing the control valve in a manual steering mode.
Figure 6:
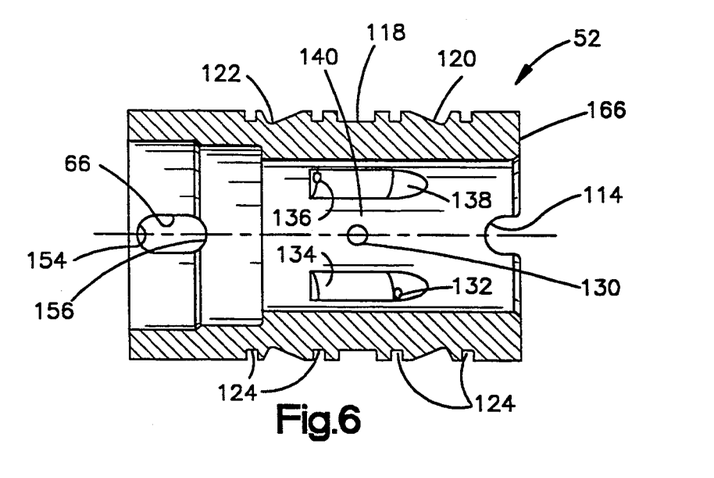
FIG. 6 is an enlarged sectional view of an outer valve member of the control valve of FIG. 1.

A plurality of annular grooves are formed in the outer surface of the outer valve member 52. These include a fluid inlet groove 118, a first motor groove 120, and a second motor groove 122 (FIG. 6). The fluid inlet groove 118 is supplied with high pressure fluid from the pump 18 (FIG. 1) through the port 90 in the housing 54 when the velocity of the vehicle is below the predetermined value. The motor groove 120 is in fluid communication with motor cylinder chamber 80 via the port 92. The motor groove 122 is in fluid communication with motor cylinder chamber 82 via the port 94. Located between the grooves 118, 120, 122 and the ends of the outer valve member 52 are a series of seal grooves 124 (FIG. 6) which carry seals 126 (FIG. 2). The seals 126 block fluid leakage between the grooves 118, 120, 122 and the ends of the outer valve member 52.

Figure 7:
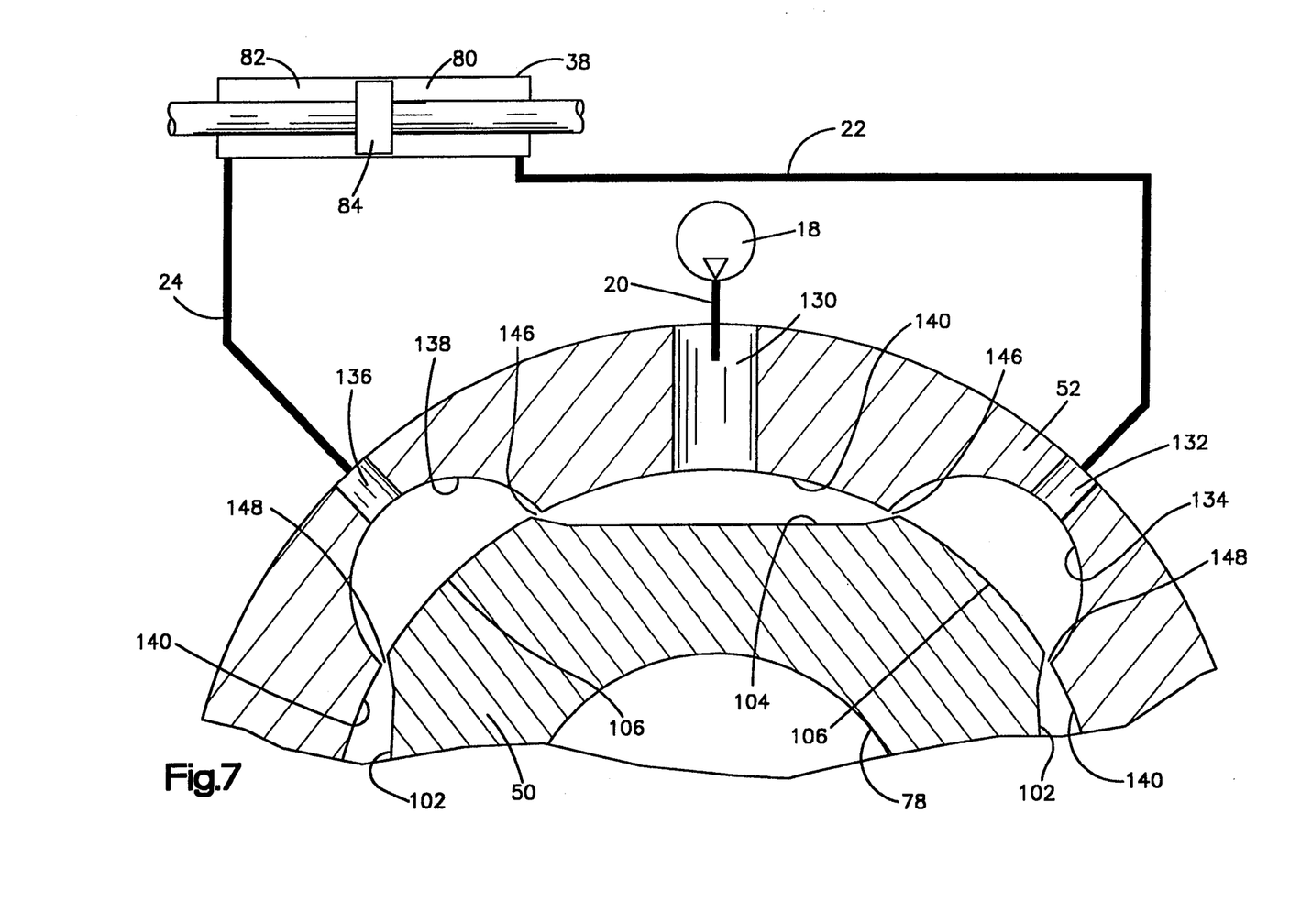
FIG. 7 is a partial sectional view of the control valve taken along the line 7—7 of FIG. 2.

A pair of diametrically opposite passages 130, one of which is shown in FIG. 6, connect the fluid inlet groove 118 with the interior of the outer valve member 52. A pair of passages 132, one of which is shown in FIG. 2 connect the motor groove 120 with a pair of axially extending grooves 134 formed on the inner surface of the outer valve member 52. A pair of passages 136, one of which is shown in FIG. 2, connect the motor groove 122 with a pair of axially extending grooves 138 formed on the inner surface of the outer valve member 52. Located between the axially extending grooves 134 and 138 (FIG. 6) are axially extending lands 140. The grooves 134 and 138 and lands 140 formed on the inner surface of the outer valve member 52 are in facing engagement with the grooves 100 and 104 and lands 106 on the outer surface of the inner valve member 50 (FIG. 7).

The lands 106 on the inner valve member 50 and the lands 140 on the outer valve member 52 cooperate to define flow metering orifices or gaps 146 (FIG. 7) for controlling the flow of fluid from the pump 18 to the power steering motor 38. Fluid flows from the grooves 104 on the inner valve member 50 through the orifices 146 to the grooves 134 or 138 on the outer valve member 52. The lands 140 on the outer valve member 52 and the lands 106 on the inner valve member 50 also cooperate to define flow metering orifices or gaps 148 for controlling the flow of fluid from the power steering motor 38 to the reservoir 40. Fluid flows from the grooves 134 or 138 on the outer valve member 52 through the orifices 148 to the widened end portions 102 of the grooves 100 on the inner valve member 50.

Figure 3:
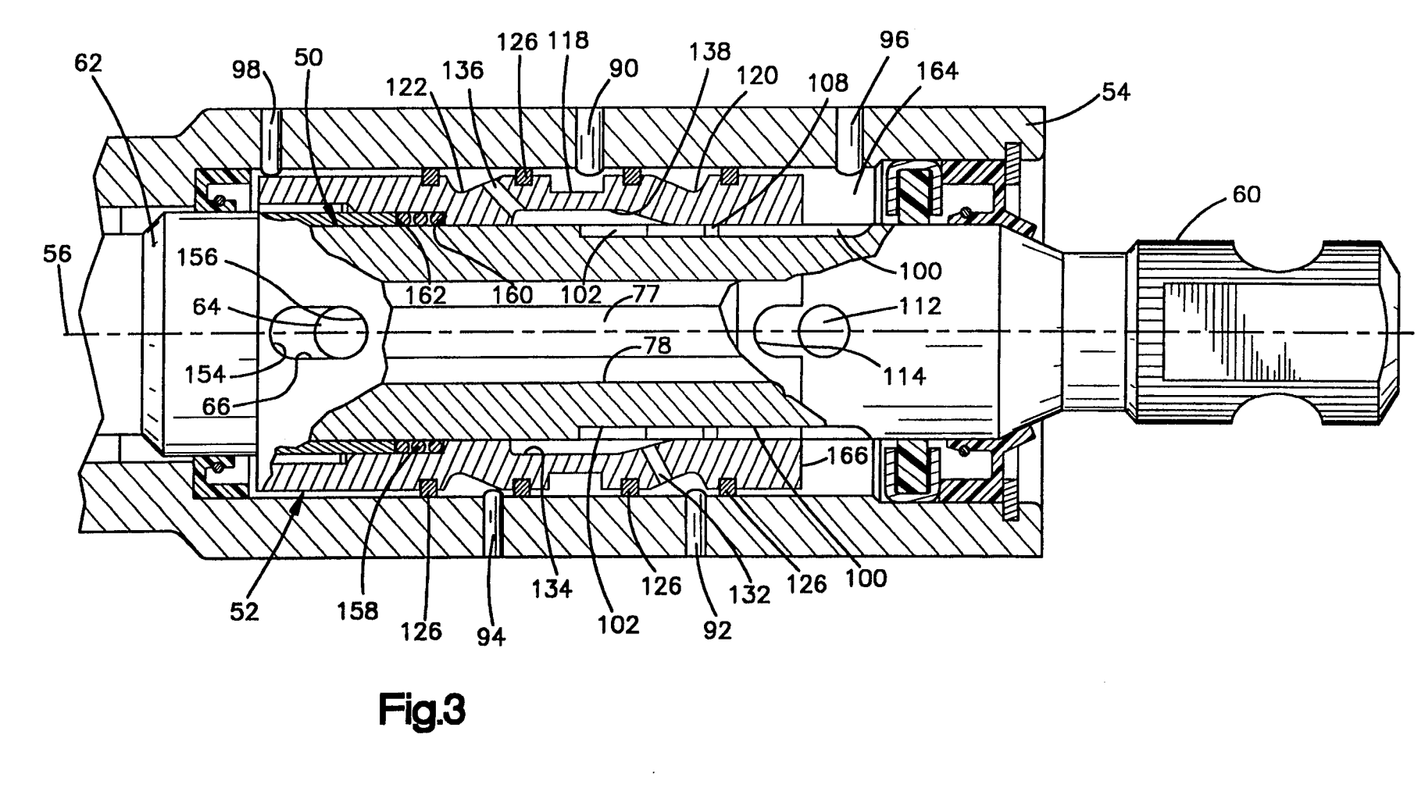
FIG. 3 is a view of a portion of FIG. 1, similar to FIG. 2, on an enlarged scale showing the control valve in a power assist steering mode.

The outer valve member 52 is axially movable relative to the inner valve member 50 between first and second axial positions. The first axial position of the outer valve member 52 is defined by first end surfaces 154 of the slots 66 through which the pins 64 of the output member 62 extend. The pins 64 engage the first end surfaces 154 of the slots 66. The pins 112 of the inner valve member 50 are located within the slots 114 in the outer valve member 52 to interconnect the input shaft 60 and the output member 62 (FIG. 2). The second axial position of the outer valve member 52 is defined by second end surfaces 156 of the slots 66. The pins 64 of the output member 62 engage the surfaces 156 in the slots 66 and the pins 112 are located out of the slots 114 when the outer valve member 52 is in its second axial position (FIG. 3).

A spring 158 acts between an annular surface 160 on the outer valve member 52 and an annular surface 162 located on the output member 62 to bias the outer valve member 52 into its first axial position shown in FIG. 2. The housing 54 defines a fluid pressure chamber 164 in fluid communication with the reservoir 40 via the return port 96. Fluid from the power steering motor 38 flows along the grooves 100 in the inner valve member 50 to the fluid pressure chamber 164. Fluid pressure in the chamber 164 acts against an axial end surface 166 of the outer valve member 52. The pressure relief valve 44 elevates the pressure in the chamber 164 when the velocity of the vehicle is below the predetermined value. The pressure in the chamber 164 acts against the end surface 166 to move the outer valve member 52 to its second axial position shown in FIG. 3.

When the velocity of the vehicle exceeds the predetermined value, the electronic control unit 32 turns the motor 30 off. The pump 18 does not supply fluid to the steering system 10 and the pressure in the chamber 164 is at a minimum. The spring 158 holds the outer valve member 52 in its first axial position, shown in FIG. 2, in which the pins 112 on the inner valve member 50 are located within the recesses 114 in the outer valve member. The outer valve member 52 directly interconnects the input shaft 60 and the output member 62 to effect manual steering of the vehicle.

Upon turning the steering wheel 12, the input shaft 60, the outer valve member 52 and the output member 62 rotate together relative to the housing 54. The pinion 74 meshes with the rack 76 to cause the rack 76 to move and steer the vehicle wheels. Upon movement of the rack 76, the piston 84 of the power steering motor 38 moves to compress one of the motor cylinder chambers 80 or 82. Fluid from the motor cylinder chamber 80 or 82 flows to the control valve 14 and is conducted to the grooves 134 or 138 in the outer valve member 52. While the outer valve member 52 is in its first axial position the grooves 134 and 138 are in fluid communication with the annular groove 108 in the inner valve member 50, see FIG. 2. Fluid flows to the annular groove 108 and does not flow through the flow metering orifices 148. Fluid flows from the annular groove 108 in the inner valve member 50 along the grooves 100, into the fluid pressure chamber 164 and back to the reservoir 40 through the return conduit 42.

When the velocity of the vehicle is below the predetermined value, the ECU 32 turns the motor 30 on to operate the pump 18. Fluid from the pump 18 flows to the control valve 14 and is directed to the fluid pressure chamber 164. The pressure relief valve 44 causes the pressure in the fluid pressure chamber 164 to increase and act against the axial end portion 166 of the outer valve member 52. The pressure in the fluid pressure chamber 164 acts against the spring 158 to move the outer valve member 52 from its first axial position shown in FIG. 2 to its second axial position shown in FIG. 3. The pins 112 on the inner valve member 50 are located out of the slots 114 in the outer valve member 52. The input shaft 60 and the inner valve member 50 are therefore rotatable relative to the outer valve member 52 and the output member 62 to port fluid to the power steering motor 38.

When the steering wheel 12 is rotated, the input shaft 60 and the inner valve member 50 rotate relative to the outer valve member 52 and the output member 62. The relative rotation between the input shaft 60 and the output member 62 is resisted by the torsion bar 77. Fluid from the pump 18 flows into the grooves 104 in the inner valve member 50 and through the flow metering orifices 146 to one of the motor cylinder chambers 80 or 82. Fluid from the other motor cylinder chamber 80 or 82 flows back to the control valve 14 and to the grooves 134 or 138 in the outer valve member 52. Due to the axial position of the outer valve member 52 relative to the inner valve member 50, see FIG. 3, the grooves 134 and 138 are not in fluid communication with the annular groove 108 in the inner valve member 50. The fluid from the grooves 134 or 138 flows through the flow metering orifices 148 to the widened end portions 102 of the grooves 100 in the inner valve member 50. The fluid flows along the grooves 100 to the fluid pressure chamber 164 and back to the reservoir 40 through the return conduit 42. The pressure relief valve 44 maintains the pressure in the fluid pressure chamber 164 to hold the outer valve member 52 in its second axial position while the velocity of the vehicle is below the predetermined value.

From the above description of the invention, those skilled in the art will perceive improvements, changes and modifications. Such improvements, changes and modifications within the skill of the art are intended to be covered by the appended claims.

Having described the invention, the following is claimed:

1. A steering system for a vehicle comprising:
   a housing;
   an input shaft;
   means for supporting said input shaft for rotation relative to said housing;
   an output member;
   means for supporting said output member for rotation relative to said housing and said input shaft;
   first and second coaxial valve members, means for supporting said first and second valve members for rotation relative to each other to port pressurized hydraulic fluid to a vehicle power steering motor, one of said first and second valve members being connected to and rotating with said input shaft and the other of said first and second valve members being connected to and rotating with said output member, said second valve member moving axially relative to said first valve member between first and second axial position, said input shaft and said output member being directly interconnected by said second valve member and rotating together relative to said housing to effect manual steering of the vehicle when said second valve member is in its first position, said input shaft rotating relative to said second valve member and said output member to effect power assisted steering of the vehicle by porting pressurized hydraulic fluid to said steering motor when said second valve member is in its second position; and
   means for moving said second valve member from its first position to its second position in response to the velocity of the vehicle being below a predetermined value.

2. A steering system as defined by claim 1 wherein said second valve member rotates with said input shaft and said output member when said second valve member is in its first position.

3. A steering system as defined by claim 1 further including means elastically biasing said second valve member towards its first position.

4. A steering system as defined by claim 1 wherein said moving means includes means defining a fluid pressure chamber for receiving fluid, the pressure of which acts on said second valve member to move said second valve member from its first position to its second position.

5. A steering system as defined by claim 1 further including a pump for supplying hydraulic fluid to effect power steering of the vehicle, said pump being turned on when the velocity of the vehicle is below the predetermined value, said pump being turned off when the velocity of the vehicle exceeds the predetermined value.

6. A steering system as defined by claim 1 wherein said first valve member is connected to and rotates with said input shaft, said second valve member being connected to and rotating with said output member.

7. A steering system as defined by claim 6 wherein said second valve member is located radially outwardly of said first valve member.

8. A steering system for a vehicle comprising:
a housing;
an input shaft, said input shaft having a radially extending pin;
means for supporting said input shaft for rotation relative to said housing;
an output member, said output member having a radially extending pin;
means for supporting said output member for rotation relative to said input shaft;
means for interconnecting said input shaft and said output member for rotation together relative to said housing when the velocity of the vehicle exceeds a predetermined value, said interconnecting means axially moving between first and second positions, said input shaft being connected to and rotating with said output member when the velocity of the vehicle exceeds a predetermined value and said interconnecting means is in its first position and said input shaft rotating relative to said output member when the velocity of the vehicle is below the predetermined value and said interconnecting means is in its second position, said interconnecting means including first and second slots, said pin on said input shaft being received in said first slot of said interconnecting means and said pin on said output member being received in said second slot when the velocity of the vehicle exceeds the predetermined value and said interconnecting means is in its first position, one of said pins being located out of its corresponding slot in said interconnecting means when the velocity of the vehicle is below the predetermined value; and
means for moving said interconnecting means from its first position to its second position when the velocity of the vehicle is below the predetermined value.

9. A steering system as defined by claim 8 further including:
a pump for supplying fluid to said steering system, said pump being turned off when said interconnecting means is in its first position and being turned on when said interconnecting means is in its second position;
first and second coaxial valve members rotating relative to each other to port fluid from said pump to a vehicle power steering motor, said first and second valve members having surfaces cooperating to define a flow metering orifice through which fluid flows from the power steering motor to a reservoir; and
means for causing fluid flow from the power steering motor to the reservoir to bypass said flow metering orifice when the velocity of the vehicle exceeds the predetermined value.

10. A steering system as defined by claim 8 further including a first valve member connected to and rotating with said input shaft, said interconnecting means comprising a second valve member connected to and rotating with said output member and coaxial with said first valve member, said first valve member rotating relative to said second valve member to port fluid to a power steering motor.

11. A steering system as defined by claim 10 wherein said first and second slots are located within said second valve member, said pin on said input shaft being located out of said first slot when the velocity of the vehicle is below the predetermined value.

12. A steering system as defined by claim 8 wherein said moving means includes means defining a fluid pressure chamber for receiving fluid, the pressure of which acts on said interconnecting means to move said interconnecting means from its first position to its second position.

13. A steering system as defined by claim 12 further including a spring biasing said interconnecting means to its first position.

14. A steering system for a vehicle comprising:
a housing;
an input shaft;
means for supporting said input shaft for rotation relative to said housing;
an output member, rotating relative to said input shaft when the velocity of the vehicle is below a predetermined value and rotating together with said input shaft when the velocity of the vehicle exceeds the predetermined value;
means for interconnecting said input shaft and said output member when the velocity of the vehicle exceeds the predetermined value;
a pump for supplying fluid to said steering system, said pump being turned on when the velocity of the vehicle is below the predetermined value and being turned off when the velocity of the vehicle exceeds the predetermined value;
first and second coaxial valve members, means for supporting said first and second valve members for rotation relative to each other to port fluid from said pump to a vehicle power steering motor, said first and second valve members having surfaces cooperating to define a flow metering orifice through which fluid flows from the power steering motor to a reservoir when the velocity of the vehicle is below the predetermined value; and
means for causing fluid flow from the power steering motor to the reservoir to bypass said flow metering orifice when the velocity of the vehicle exceeds the predetermined value.

15. A steering system as defined by claim 4 wherein said first valve member includes a groove for directing fluid flow to the reservoir and said second valve member includes a groove for directing fluid flow from said power steering motor to said groove of said first valve member.

16. A steering system for a vehicle comprising:
a housing;
an input shaft;
means for supporting said input shaft for rotation relative to said housing;
an output member;
means for supporting said output member for rotation relative to said housing and said input shaft;
first and second coaxial valve members, means for supporting said first and second valve members for rotation relative to each other to port pressurized hydraulic fluid to a vehicle power steering motor, one of said first and second valve members being connected to and rotating with said input shaft and the other of said first and second valve members being connected to and rotating with said output member, said second valve member moving axially relative to said first valve member between first and second axial positions, said input shaft and said output member being directly interconnected by said second valve member and rotating together relative to said housing to effect manual steering of the vehicle when said second valve member is in its first position, said input shaft rotating relative to said second valve member and said output member to effect power assisted steering of the vehicle by porting pressurized hydraulic fluid to said steering motor when said second valve member is in its second position;
means for moving said second valve member from its first position to its second position when the velocity of the vehicle is below a predetermined value; and
means elastically biasing said second valve member towards its first position, said means biasing said second valve member into its first position including a spring extending between said second valve member and said output member.

17. A steering system as defined by claim 16 wherein said second valve member includes a second slot, said input shaft including a radially extending pin received in said second slot when said second valve member is in its first position, said pin on said input shaft being located out of said second slot when said valve member is in its second position.

18. A steering system for a vehicle comprising:
a housing;
an input shaft;
means for supporting said input shaft for rotation relative to said housing;
an output member;
means for supporting said output member for rotation relative to said housing and said input shaft;
first and second coaxial valve members, means for supporting said first and second valve members for rotation relative to each other to port pressurized hydraulic fluid to a vehicle power steering motor, one of said first and second valve members being connected to and rotating with said input shaft and the other of said first and second valve members being connected to and rotating with said output member, said second valve member moving axially relative to said first valve member between first and second axial positions, said input shaft and said output member being directly interconnected by said second valve member and rotating together relative to said housing to effect manual steering of the vehicle when said second valve member is in its first position, said input shaft rotating relative to said second valve member and said output member to effect power assisted steering of the vehicle by porting pressurized hydraulic fluid to said steering motor when said second valve member is in its second position; and
means for moving said second valve member from its first position to its second position when the velocity of the vehicle is below a predetermined value;
said second valve member including a first slot having first and second end portions, said output member including a radially extending pin received in said first slot in said second valve member, said first end portion of said first slot engaging said pin to define the first axial position of said second valve member and said second end portion of said first slot engaging said pin to define the second axial position of said second valve member.

19. A steering system for a vehicle comprising:
a housing;
an input shaft;
means for supporting said input shaft for rotation relative to said housing;
an output member;
means for supporting said output member for rotation relative to said housing and said input shaft;
first and second coaxial valve members, means for supporting said first and second valve members for rotation relative to each other to port pressurized hydraulic fluid to a vehicle power steering motor, one of said first and second valve members being connected to and rotating with said input shaft and the other of said first and second valve members being connected to and rotating with said output member, said second valve member moving axially relative to said first valve member between first and second axial positions, said input shaft and said output member being directly interconnected by said second valve member and rotating together relative to said housing to effect manual steering of the vehicle when said second valve member is in its first position, said input shaft rotating relative to said second valve member and said output member to effect power assisted steering of the vehicle by porting pressurized hydraulic fluid to said steering motor when said second valve member is in its second position;
means for moving said second valve member from its first position to its second position when the velocity of the vehicle is below a predetermined value;
said first and second valve members including surfaces cooperating with each other to define a flow metering orifice through which fluid flows from the power steering motor to a reservoir;
a pump for supplying power steering fluid to said steering system, said pump being turned off when said second valve member is in its first position and being turned on when said second valve member is in its second position; and
means for causing fluid flow from the power steering motor to bypass said flow metering orifice when said second valve member is in its first position.

20. A steering system for a vehicle comprising:

a housing;

an input shaft;

means for supporting said input shaft for rotation relative to said housing;

an output member rotating relative to said input shaft when the velocity of the vehicle is below a predetermined value and rotating together with said input shaft when the velocity of the vehicle exceeds the predetermined value;

means for interconnecting said input shaft and said output member when the velocity of the vehicle exceeds the predetermined value;

a pump for supplying fluid to said steering system, said pump being turned on when the velocity of the vehicle is below the predetermined value and being turned off when the velocity of the vehicle exceeds the predetermined value;

first and second coaxial valve members, means for supporting said first and second valve members for rotation relative to each other to port fluid from said pump to a vehicle power steering motor, said first and second valve members having surfaces cooperating to define a flow metering orifice through which fluid flows from the power steering motor to a reservoir when the velocity of the vehicle is below the predetermined value;

means for causing fluid flow from the power steering motor to the reservoir to bypass said flow metering orifice when the velocity of the vehicle exceeds the predetermined value;

said first valve member including a groove for directing fluid flow to the reservoir and said second valve member including a groove for directing fluid flow from said power steering motor to said groove of said first valve member;

said second valve member axially moving relative to said first valve member between first and second positions, said input shaft and said output member being interconnected and rotating together relative to said housing to effect manual steering of the vehicle when said second valve member is in its first position, said input shaft rotating relative to said output member to effect power assisted steering of the vehicle when said second valve member is in its second position; and means for moving said second valve member from its first position to its second position when the velocity of the vehicle is below the predetermined value.

21. A steering system as defined by claim 20 wherein said groove of said second valve member directs fluid flow from the power steering motor to said groove of said first valve member when said second valve member is in its first position and said groove of said second valve member directs fluid flow to said flow metering orifice when said second valve member is in its second position.

* * * * *